(12) United States Patent
Kurata

(10) Patent No.: US 9,019,553 B2
(45) Date of Patent: Apr. 28, 2015

(54) PRINTING CONTROL APPARATUS, PRINTING CONTROL METHOD, AND STORAGE MEDIUM

(75) Inventor: Yasuo Kurata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 12/550,982

(22) Filed: Aug. 31, 2009

(65) Prior Publication Data

US 2010/0060908 A1    Mar. 11, 2010

(30) Foreign Application Priority Data

Sep. 11, 2008 (JP) ................. 2008-233164

(51) Int. Cl.
*G06K 15/02* (2006.01)
*G06F 15/00* (2006.01)
*G06F 3/12* (2006.01)

(52) U.S. Cl.
CPC ............ *G06F 3/1208* (2013.01); *G06F 3/1219* (2013.01); *G06F 3/1251* (2013.01)

(58) Field of Classification Search
USPC .......................................... 358/1.2
See application file for complete search history.

(56) References Cited

U.S. PATENT DOCUMENTS

| 2007/0153307 A1* | 7/2007 | Jung | 358/1.9 |
| 2010/0153834 A1* | 6/2010 | Abe | 715/222 |

FOREIGN PATENT DOCUMENTS

| JP | 1-217516 A | 8/1989 |
| JP | 10-006600 A | 1/1998 |
| JP | 2004-287496 A | 10/2004 |
| JP | 2005-246752 A | 9/2005 |
| WO | 2008/066142 A1 | 6/2008 |

OTHER PUBLICATIONS

XP55010697;"Printing Guide for Service Providers".

* cited by examiner

*Primary Examiner* — Thomas D Lee
(74) *Attorney, Agent, or Firm* — Canon U.S.A., Inc. IP Division

(57) ABSTRACT

A method for controlling printing for causing a printing apparatus which can print on a sheet of paper having a size other than a predetermined size to print data generated by an application capable of allocating pages corresponding to a sheet of paper having the predetermined size to a printing area includes setting a first paper size to the application in which a predetermined printing area is determined, acquiring a second paper size corresponding to the predetermined printing area and setting the second paper size to the application based on page allocation of the first paper size to the predetermined printing area, and notifying a printer driver of the second paper size. Consequently, printing can be performed by a simple operation so that print data suitably fits into a page width of a sheet of paper, even when a printing area aspect ratio can be arbitrarily determined.

22 Claims, 12 Drawing Sheets

FIG. 8
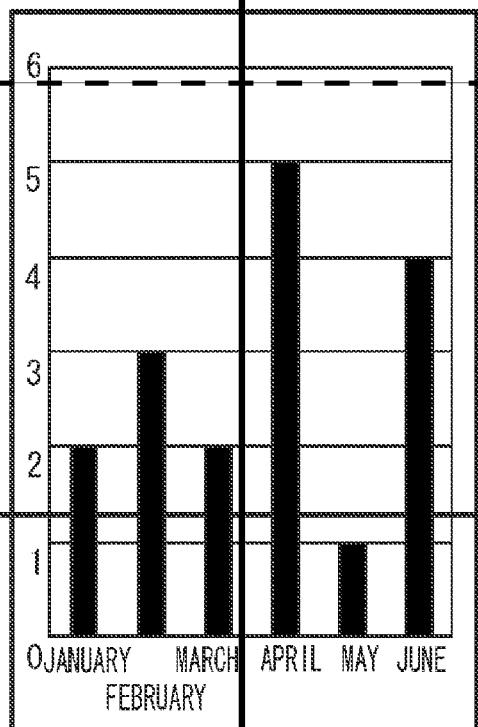
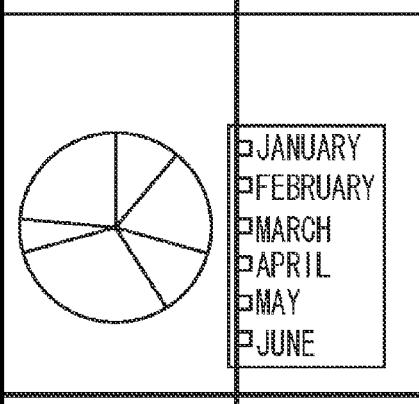

FIG. 11  PRIOR ART

FIG. 12A PRIOR ART
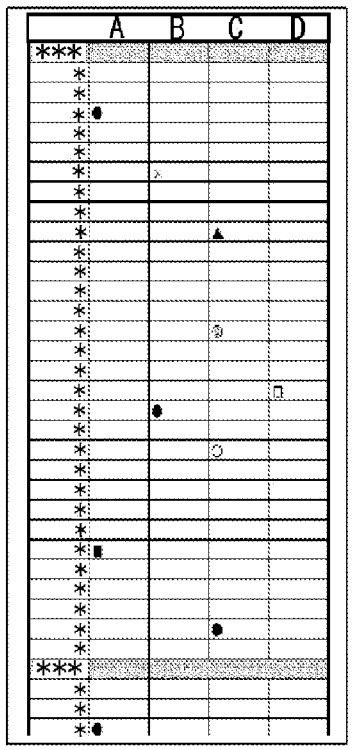
FIG. 12B PRIOR ART
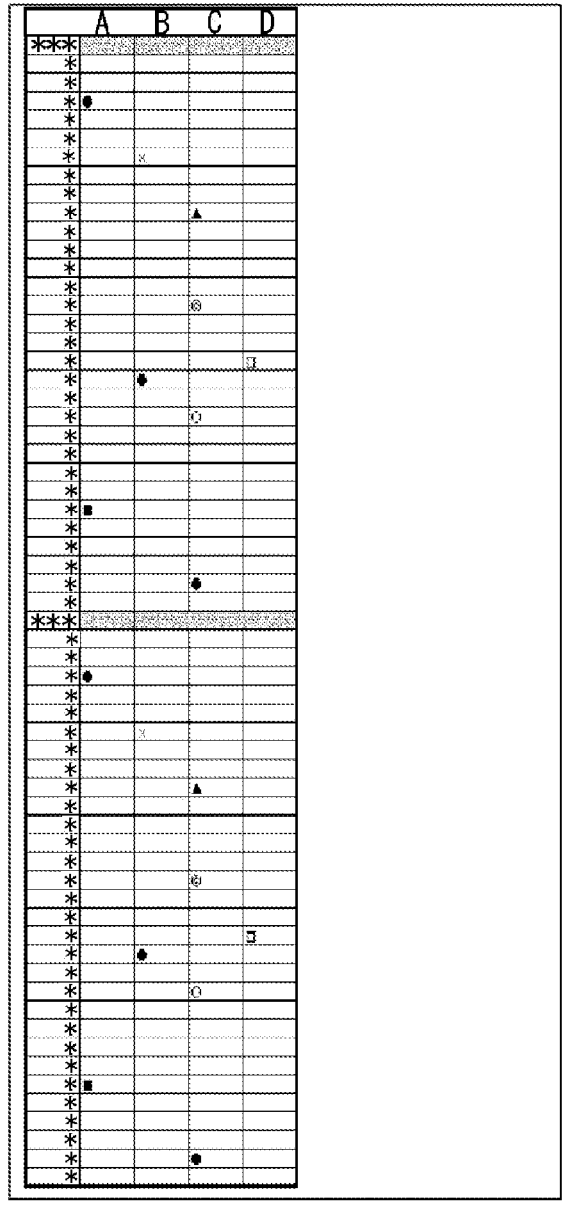
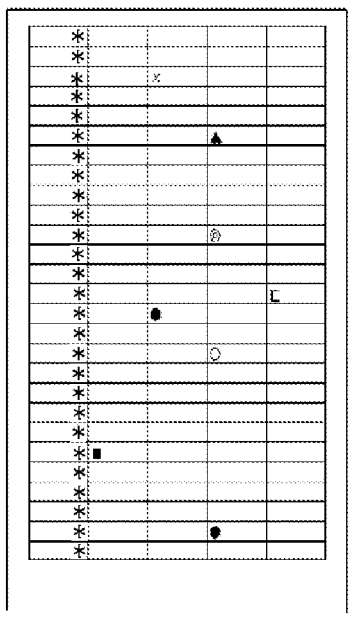

PRINTING CONTROL APPARATUS, PRINTING CONTROL METHOD, AND STORAGE MEDIUM

BACKGROUND OF THE INVENTION

1. Field of the Invention

The present invention relates to a printing control method for causing a printing apparatus which can perform printing on a sheet of paper with a size other than a predetermined size to print data generated by an application capable of allocating pages to a sheet of paper with the predetermined size.

2. Description of the Related Art

Conventionally, techniques for matching a printing area in an application with a size and aspect ratio of a sheet of paper to be printed are known. For example, Japanese Patent Application Laid-Open No. 10-006600 discusses a technique for automatically selecting a paper size into which the printing area can fit, from standard paper sizes stored in a system, based on the printing area set by a user.

However, in case of dealing with a printing area which does not include a page concept in which the aspect ratio can be arbitrarily set, such as a spreadsheet document, if printing is performed by setting the standard paper size, a page break can occur at a location not intended by the user, and unintended blank spaces can be added.

Figure 11:
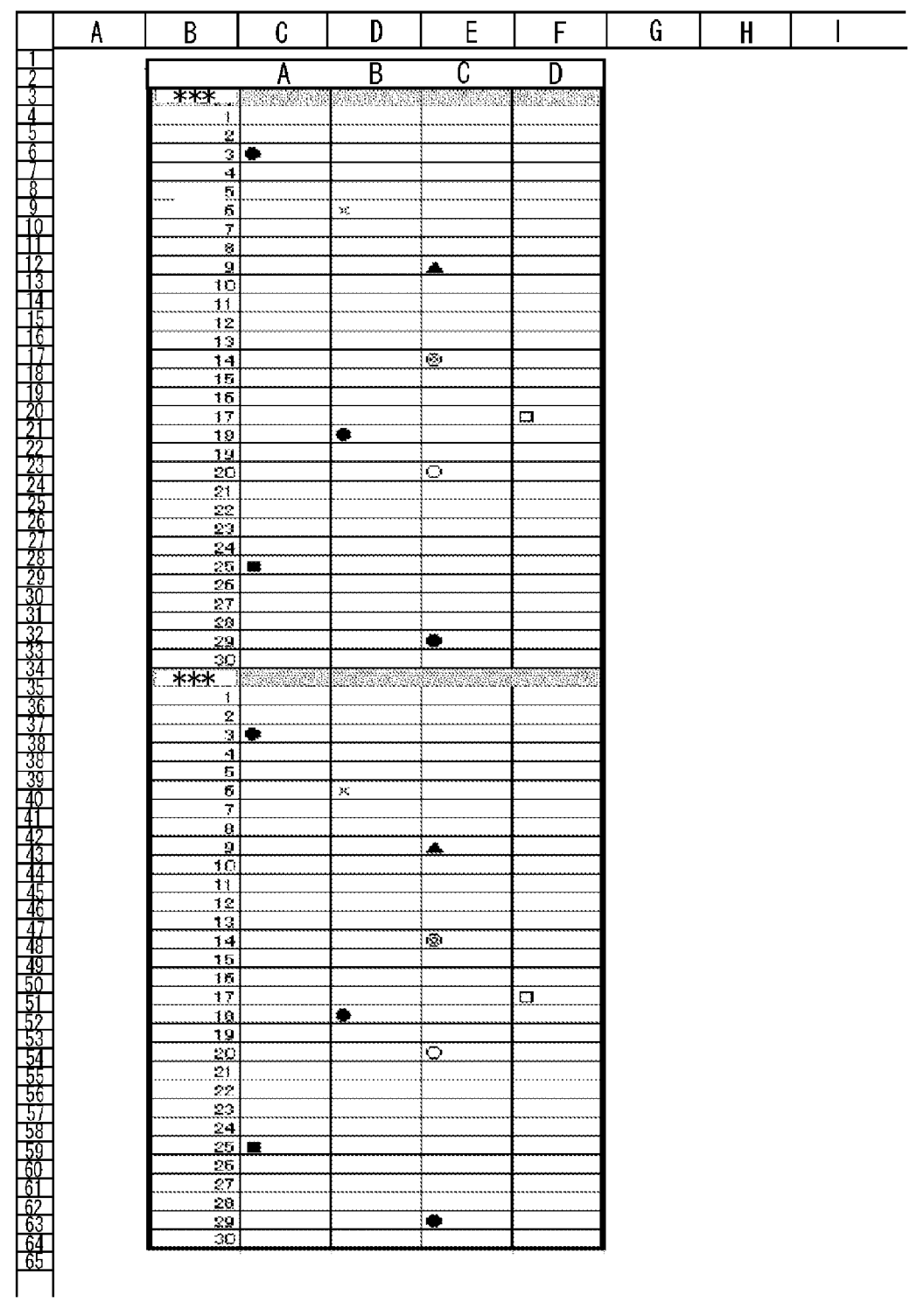

FIG. 11 illustrates an example of a spreadsheet document. A case of printing such a spreadsheet document will now be considered. FIG. 12A illustrates a printed matter when an A4 size is set as the paper size for the spreadsheet document illustrated in FIG. 11. Similarly, FIG. 12B illustrates a printed matter when an A3 size is set as the paper size for the spreadsheet document illustrated in FIG. 11.

In the example illustrated in FIG. 12A, although printing is performed to the very edge of a page width, a page break occurs midway. Further, in the example illustrated in FIG. 12B, although all of the spreadsheet data is printed within the page, there is a blank space on the right side.

The reason why such printing occurs is that the aspect ratio of the spreadsheet data is different from that of the standard sizes. Thus, the aspect ratio of print data generated by an application lacking a page concept is often different from that of the standard size, like in FIG. 11.

One way to solve such a problem is to print a spreadsheet document like that illustrated in FIG. 11 on a non-standard arbitrary cut paper or roll paper which matches the aspect ratio of the document. For example, when roll paper is used, since the aspect ratio of the page can be freely set, printing can be performed to the very edge of the page width while fitting within the page.

However, when printing on a non-standard paper size by an application which is only compatible with standard size paper, as discussed in Japanese Patent Application Laid-Open No. 1-217516, the user has to set the paper size for the application. More specifically, to print data generated by an application which does not include a page concept to the very edge of the page width while fitting within the page of a sheet of paper, the user needs to perform the following series of actions. Consequently, there is a problem that operation becomes complex.

(1) Calculate the paper size based on the aspect ratio of the printing area for each printing target.
(2) Set the calculated paper size for the application.
(3) Set a printer driver in a printer which will perform printing so that an original document of the calculated paper size is printed to the very edge of the paper width.

SUMMARY OF THE INVENTION

The present invention is directed to a printing control apparatus which allows a user to print so that print data suitably fits into a page width of a sheet of paper by a simple operation, even when a printing area aspect ratio can be arbitrarily determined.

According to an aspect of the present invention, a method for controlling printing for causing a printing apparatus which can print on a sheet of paper having a size other than a predetermined size to print data generated by an application capable of allocating pages corresponding to a sheet of paper having the predetermined size to a printing area includes setting a first paper size to the application in which a predetermined printing area is determined, acquiring a second paper size corresponding to the predetermined printing area and setting the second paper size to the application based on page allocation of the first paper size to the predetermined printing area, and notifying a printer driver of the second paper size.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a printing system including a personal computer (PC) which has a plug-in.

FIG. 8 illustrates a page when a standard paper size is set for an example of a spreadsheet document.

FIG. 11 illustrates an example of a spreadsheet document.

FIG. 12A illustrates a printed matter when an A4 size is set as the paper size for the spreadsheet document illustrated in FIG. 11.

FIG. 12B illustrates a printed matter when an A3 size is set as the paper size for the spreadsheet document illustrated in FIG. 11.

DESCRIPTION OF THE EMBODIMENTS

Various exemplary embodiments, features, and aspects of the invention will be described in detail below with reference to the drawings.

As an exemplary embodiment according to the present invention, a method for determining a paper size based on operations of a plug-in software program (hereinafter, referred to as "plug-in") of spreadsheet software will be described.

A "plug-in" is a program which adds a function to an application. For example, Microsoft Office (U.S., Microsoft Corporation), Microsoft Internet Explorer (U.S., Microsoft Corporation), and Netscape Navigator (U.S., Netscape Communications) have released means for expanding their own functions. Thus, these applications allow functions to be added by registering a plug-in.

Figure 1:
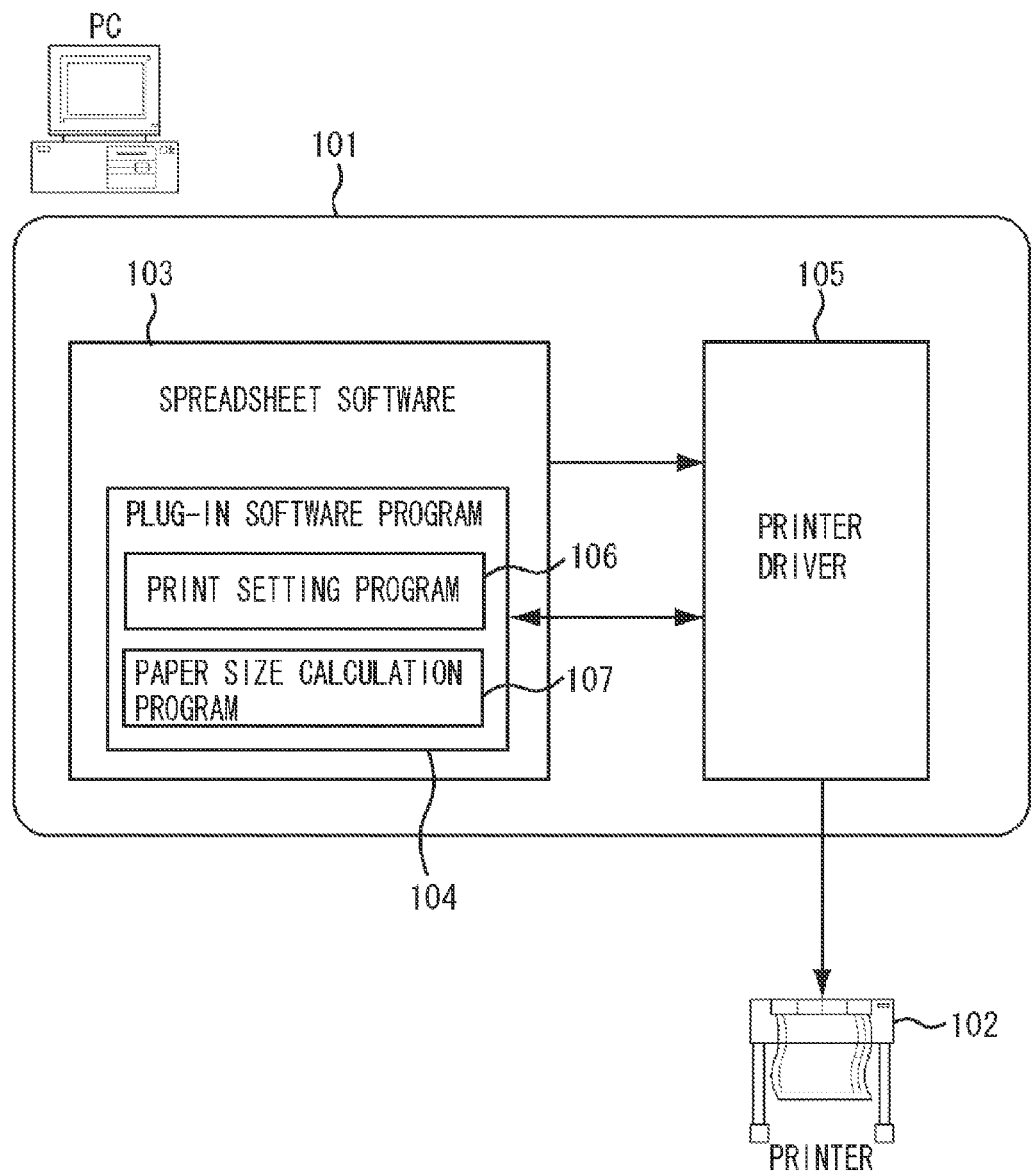

FIG. 1 illustrates a printing system including a PC which has a plug-in. The printing system illustrated in FIG. 1 is configured by a PC 101 and a printer 102 represented by a large-format printer.

Spreadsheet software 103 runs on the PC 101. The present exemplary embodiment will be described by using Microsoft Excel (U.S., Microsoft Corporation), which is a common spreadsheet software program, as an example.

A plug-in 104 expands the functions of the spreadsheet software. The plug-in 104 works on the spreadsheet software in conjunction with a printer driver which controls the spreadsheet software and the printer.

The printing system also includes a printer driver 105, to which the application requests printing by the printer via an operating system (hereinafter, referred to as "OS"). The printer driver interprets a print command received via the OS and generates print data which can be interpreted by the printer. The printer driver also receives changes in the print settings from the plug-in 104.

A print setting program 106 and a paper size calculation program 107 are also included in the plug-in 104. The paper size calculation program 107 includes procedure for calculating the paper size of the spreadsheet document.

Figure 2:
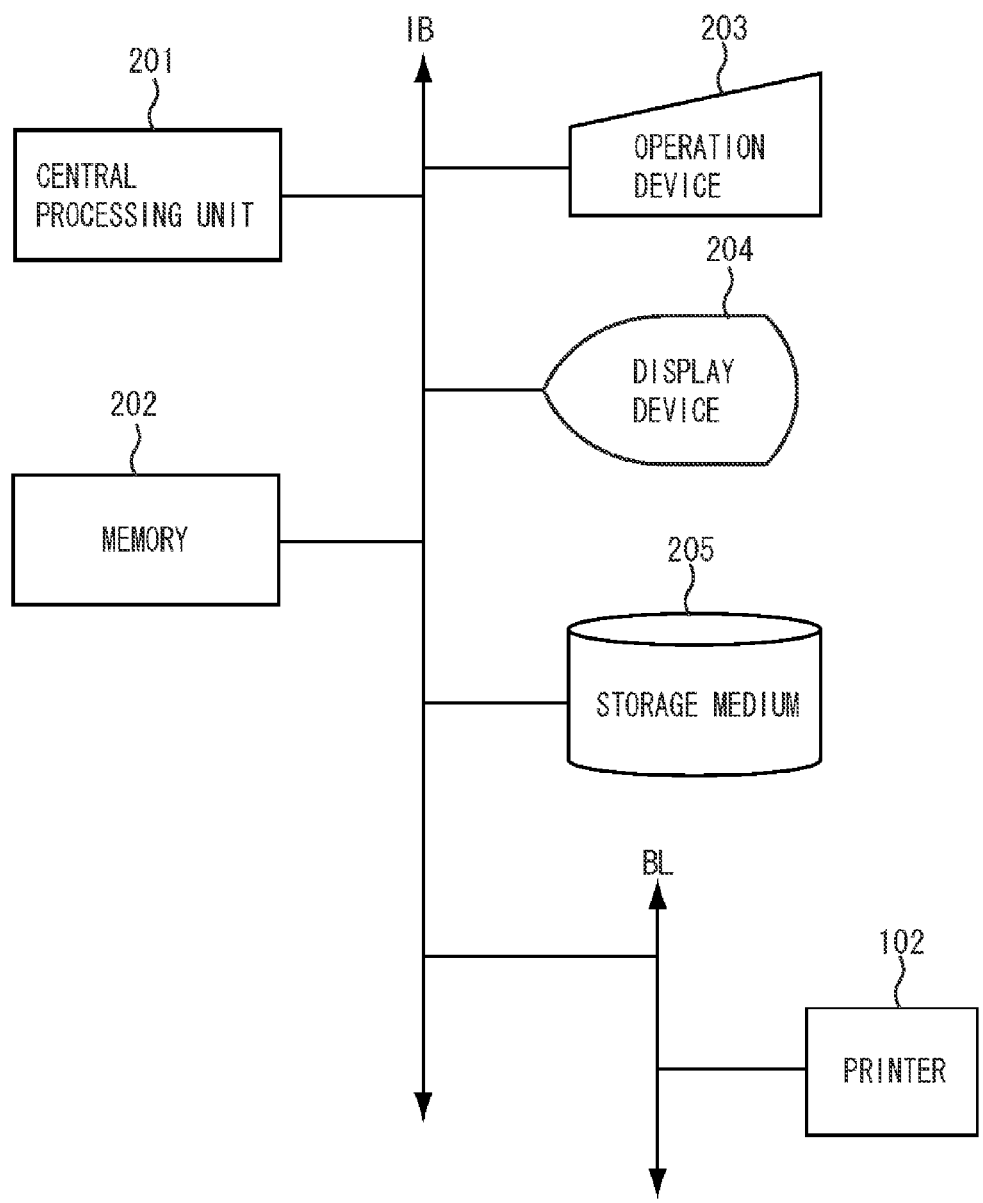
FIG. 2 is a block diagram illustrating connection between an internal configuration of the PC and an external unit.

FIG. 2 is a block diagram illustrating a connection between an internal configuration of a PC and an external unit.

The PC has a typical configuration, with a central processing unit (CPU) 201, a memory 202 such as a random access memory (RAM), and a storage medium 205 such as a read only memory (ROM) or a hard disk. The PC can be connected to an operation device 203, such as a mouse or a keyboard, and a display device 204, such as a cathode ray tube (CRT) or a liquid crystal display (LCD), via an interface (IF) (not illustrated). Each of these constituent elements is connected by an internal bus line IB. The internal bus line IB of the PC 101 is connected to the printer 102 by an external bus line IB which allows print jobs to be registered from the PC in the printer 102.

The storage medium 205 stores the plug-in 104, spreadsheet software 103, OS, and other program information. These programs are stored in the memory 202 and executed by the central processing unit 201, so that various controls of the PC 101 are performed.

The spreadsheet software 103 or the plug-in 104 causes the display device 204 to display, for example, an icon, menu, or other objects thereon. Printing is controlled based on an instruction from a user input from the operation device 203.

Figure 3:
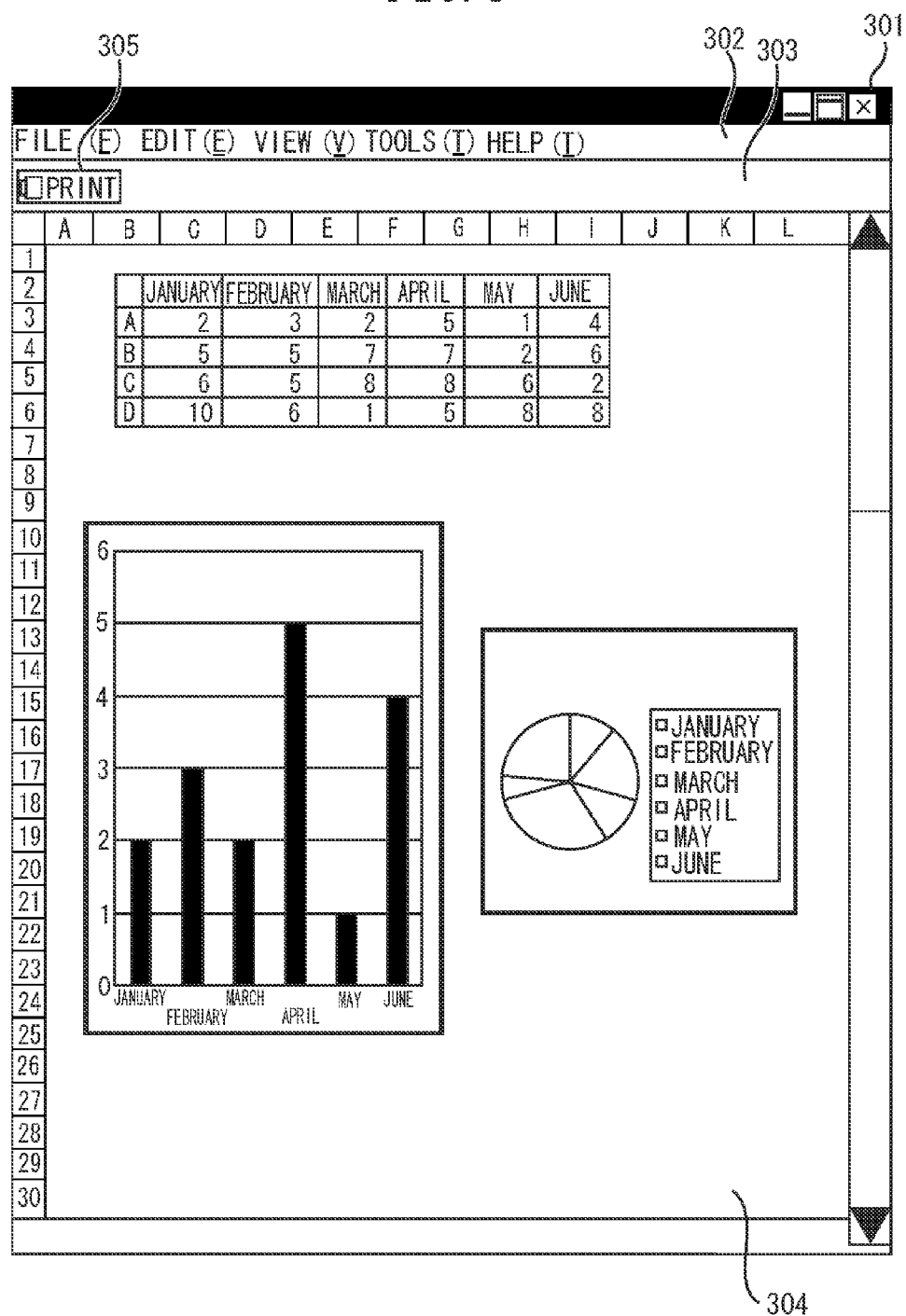
FIG. 3 illustrates a display screen when spreadsheet software is running.

FIG. 3 illustrates a display screen when the spreadsheet software 103 is running.

The screen of the spreadsheet software includes a title bar 301 which displays a title of a document which is currently being edited, a menu bar 302 which displays the functions of the spreadsheet software in a menu format, a tool bar 303 in which an icon for executing the plug-in is provided, and a document display area 304 which displays the spreadsheet document currently being edited.

A plug-in startup icon 305 is displayed on the tool bar 303 of the spreadsheet software by registering the plug-in 104 in the system of the spreadsheet software 103. In FIG. 3, the plug-in has already been registered in the spreadsheet software. A description of a method for registering the plug-in in the system of the spreadsheet software will be omitted.

Figure 4:
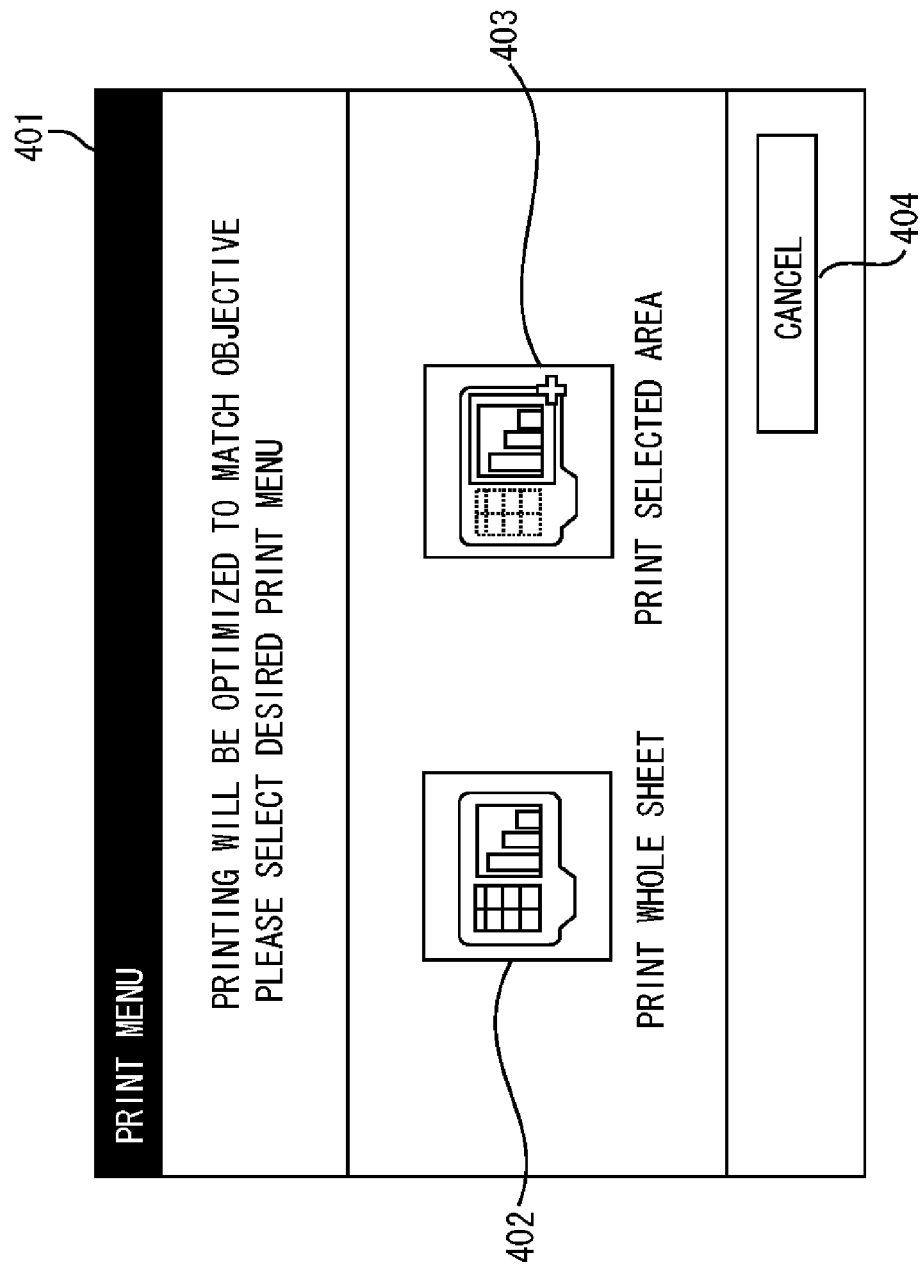
FIG. 4 illustrates a print menu dialog which the plug-in displays on the display screen.

FIG. 4 illustrates a print menu dialog which the plug-in displays on the display screen.

A print menu dialog 401 is displayed when the user presses the plug-in startup icon 305. The print menu dialog 401 includes a menu from which two types of printing method can be selected for the spreadsheet document currently being edited.

The print menu dialog 401 illustrated in FIG. 4 has a "print whole sheet" menu 402, a "print selected area" menu 403, and a cancel button 404. The menu 402 is used when whole cell area in which spreadsheet data is present is determined as the printing area of the spreadsheet document currently being edited, and the selected printing area is printed by fitting into one page. The menu 403 is used when a cell area selected just before the user pressed the plug-in startup icon 305 as the printing area, and the selected printing area is printed by fitting into one page. When the cancel button 404 is pressed by the user, the print menu dialog is closed and the operation of the plug-in is finished.

The present exemplary embodiment describes the operations when the menu 402 is pressed. However, similar processing is performed when the menu 403 is pressed and the printing area is selected by the user.

Figure 5:
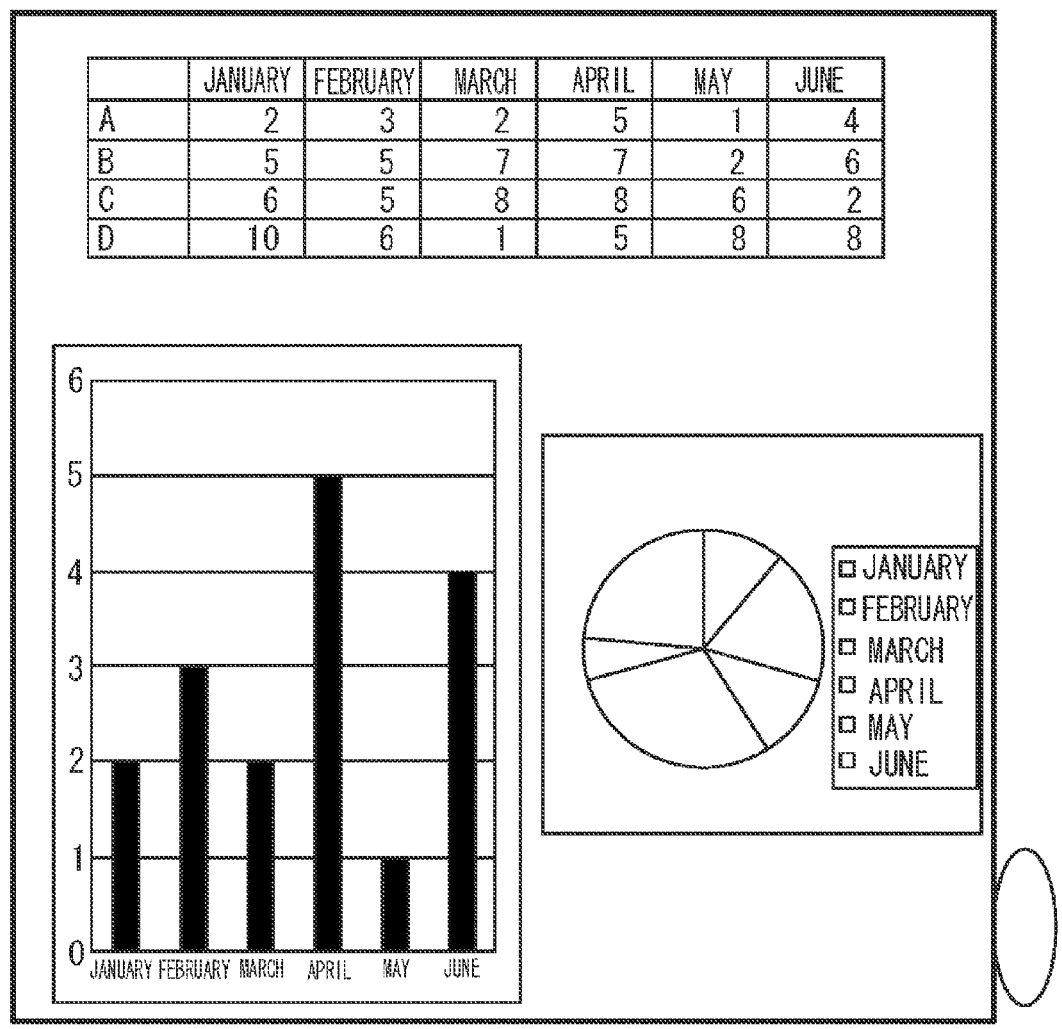
FIG. 5 is an image diagram of a printed matter to be output on roll paper included in a printer.

FIG. 5 is an image diagram of a printed matter to be output on roll paper included in the printer 102. The printed matter as illustrated by the image diagram is output when the user presses the menu 402 in the print menu dialog 401. By using the plug-in of the present exemplary embodiment to perform printing as illustrated, the area in which spreadsheet data is present on the spreadsheet document is automatically set as the printing area. The paper size into which the printing area can fit is automatically calculated and set in the spreadsheet software, and the printer prints to the very edge of the roll paper width.

The processing when the plug-in is executed will be described based on a flowchart.

Figure 6:
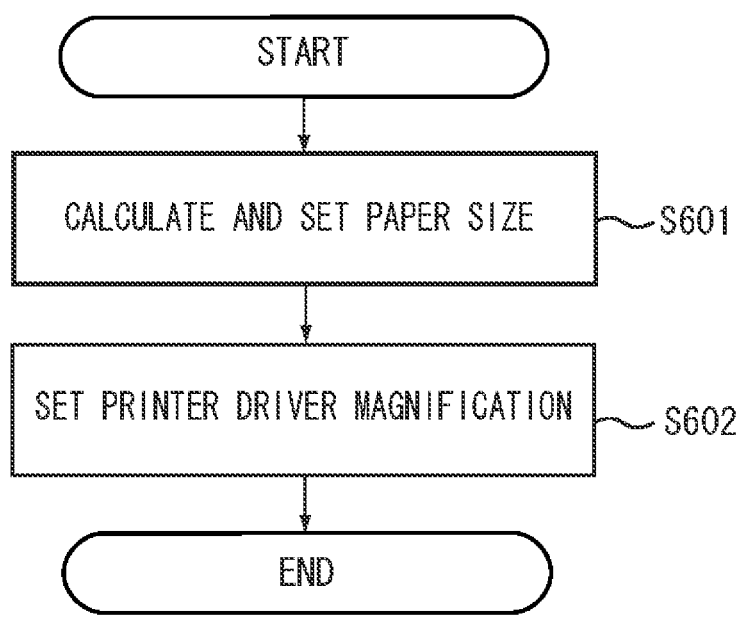
FIG. 6 is a flowchart illustrating procedure for print setting.

FIG. 6 is a flowchart illustrating procedure for print setting. When the user selects the menu 402 using the operation device 203, the processing illustrated in FIG. 6 is realized by the central processing unit 201 reading the plug-in stored in the storage medium 205 and executing the read plug-in with the memory 202 as a work memory.

In step S601, the paper size which can fit the whole cell area in which spreadsheet data is present in the spreadsheet document into one page is calculated and set. This processing may be realized by executing the paper size calculation program 107.

Figure 7:
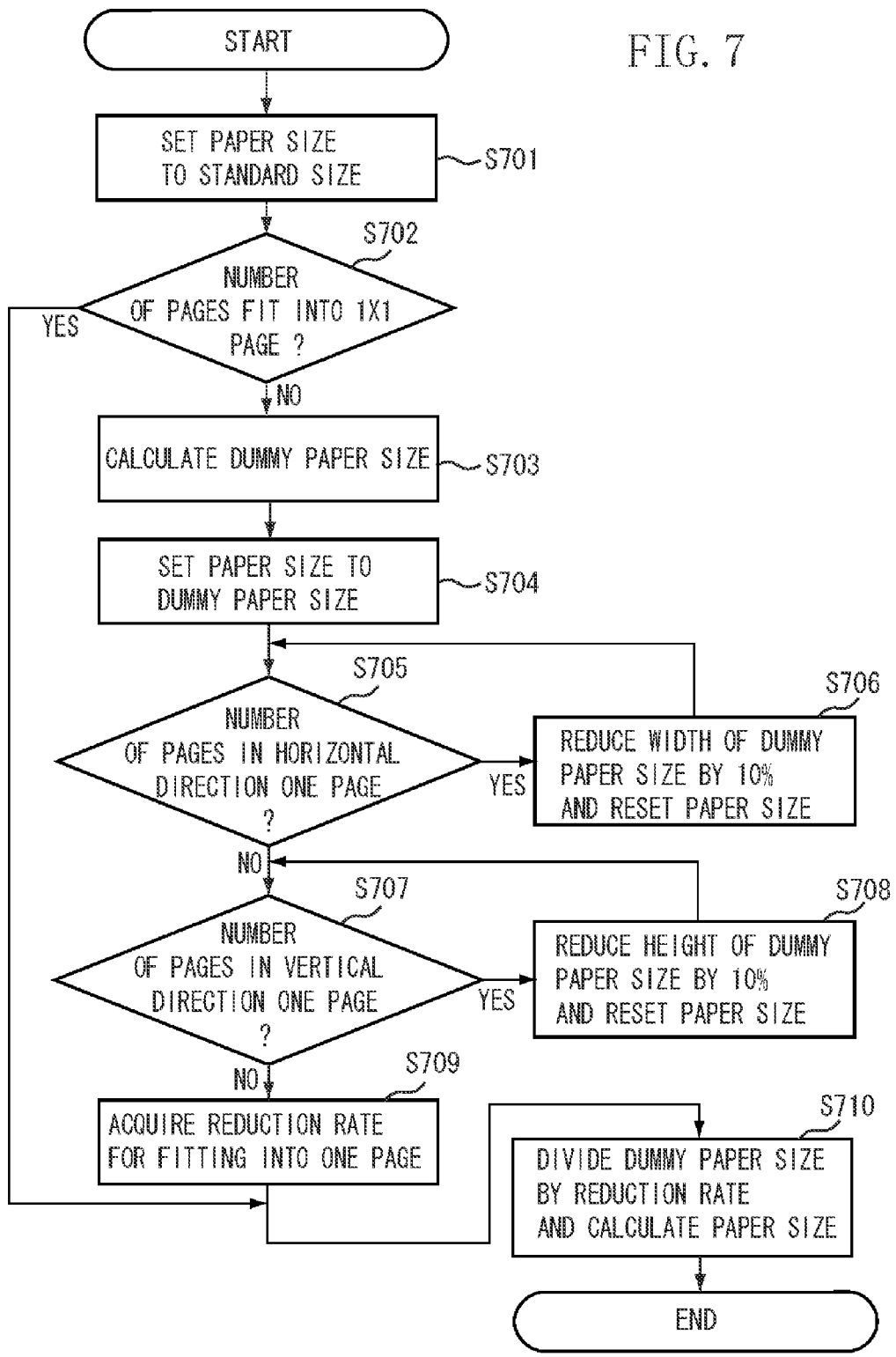
FIG. 7 is a flowchart illustrating operations of a paper calculation program.

FIG. 7 is a flowchart illustrating procedure performed by the paper size calculation program.

In step S701, a paper size to serve as a standard for the spreadsheet document (standard paper size) is set. Here, the standard paper size does not have to be set to a specific size. The standard paper size may be set to any size which can be handled by the printer driver. The present exemplary embodiment will be described using an example in which the standard paper size is a minimum paper size which can be handled by the printer driver.

Next, in step S702, a number of pages (X pages in the horizontal direction×Y pages in the vertical direction) when the spreadsheet document is printed with the current paper size setting (set in step S701 to the standard paper size) is calculated. Based on the calculated result, processing is branched. In the following steps S705 and S707 also, the processing is branched based on the number of pages.

The spreadsheet software normally includes sizes corresponding to a width and a height of cells in the spreadsheet document. Thus, it can be recognized what area of cells will fit into a paper size for the width and the height of the set paper size. More specifically, the cell where the page break will occur if printing is performed with the current paper size can be recognized. Therefore, the paper size calculation program can calculate the size when the printing area is printed based on the size of the set paper size and the number of pages calculated by the spreadsheet software.

If it is determined in step S702 that the number of pages fits into a 1×1 page when printing is performed in the standard paper size (YES in step S702), the paper size calculation program is finished with the paper size set to the standard paper size. On the other hand, if it is determined that the number of pages does not fit into a 1×1 page (NO in step S702), the processing proceeds to step S703.

In step S703, the paper size into which the cell area in which the spreadsheet data is present in the spreadsheet document fits within one page (dummy paper size) is calculated based on the standard paper size and the number of pages (X pages in the horizontal direction×Y pages in the vertical direction) acquired in step S702.

A width of the dummy paper size is determined by expanding the width of the standard paper size by a factor of the acquired number of pages, and a height of the dummy paper size is determined by expanding the height of the standard paper size by a factor of the acquired number of pages. More specifically, the dummy paper size width and height are calculated based on the following equations.

Dummy Paper Size (width)=Standard Paper Size (width)×$X$

Dummy Paper Size (height)=Standard Paper Size (height)×$Y$

In step S704, the dummy paper size calculated in step S703 is set as the paper size.

Next, in step S705, the processing is branched based on the number of pages in the horizontal direction for the current paper size setting (set in step S704 to the dummy paper size). If it is determined that the number of pages fits into one page in the horizontal direction (YES in step S705), the processing proceeds to step S706.

In step S706, the width of the dummy paper size is reduced by 10%, this reduced size is reset as the paper size, and the processing returns to step S705. As long as it is determined in step S705 that the number of pages fits into one page, the processing of step S706 is repeated. When it is determined that the number of pages does not fit into one page (NO in step S705), the processing proceeds to step S707.

In step S707, the processing is branched based on the number of pages in the vertical direction for the current paper size setting. If it is determined that the number of pages fits into one page in the vertical direction (YES in step S707), the processing proceeds to step S708.

In step s708, the height of the dummy paper size is reduced by 10%, this reduced size is reset as the paper size, and the processing returns to step S707. As long as it is determined in step S707 that the number of pages fits into one page, the processing of step S708 is repeated. When it is determined that the number of pages does not fit into one page (NO in step S707), the processing proceeds to step S709.

In step S709, a reduction rate of the spreadsheet document for fitting the whole cell area in which the spreadsheet data is present into one page is acquired for the current paper size setting. As described above, the spreadsheet software includes the sizes corresponding to the width and the height of the cells. Thus, if the sizes corresponding to the width and the height of the cells are reduced, the whole cell area in which the spreadsheet data is present can be fit into one page. The reduction rate can be acquired from the spreadsheet software.

In step S710, a size obtained by dividing the currently set paper size by the reduction rate for reducing the spreadsheet document acquired in step S709 is calculated, and the calculated size is reset as the paper size. Accordingly, the paper size which fits the spreadsheet document into one page can be set.

Returning FIG. 6, in step S601, when the calculation of the paper size by the above-described steps S701 to S710 and the setting of the paper size in the spreadsheet software are completed, the processing proceeds to step S602.

In step S602, the print setting program 106 notifies the printer driver 105 of the paper size calculated in step S601. The printer driver 105 then sets the magnification so that the printing area is printed to the very edge of the width of the roll paper which is mounted in the printer 102. When printing is performed on roll paper, the notified paper size may be a length in the width direction of the paper size.

After the processing illustrated in FIG. 6, the plug-in instructs the spreadsheet software to send a print command. Consequently, a printed matter like that illustrated in FIG. 5 can be obtained from the printer.

Several spreadsheet document examples will be used to describe the processing performed by the paper size calculation program to calculate the paper size.

FIG. 8 illustrates pages when the standard paper size is set for a spreadsheet document. First, the calculation of the paper size by the paper size calculation program will be described using FIG. 8. The spreadsheet document of FIG. 8 has cells which are all the same size.

A dotted line 801 in FIG. 8 indicates cell areas which are allocated to respective pages when the standard paper size is set in step S701 (in the present exemplary embodiment, assuming the minimum size which the printer driver can handle).

The spreadsheet document illustrated in FIG. 8 is divided into four pages in the horizontal direction and three pages in the vertical direction based on the standard paper size. Thus, the paper size calculation program calculates and sets the dummy paper size with a width of four times and a height of three times the standard paper size based on the number of divisions.

Figure 9:
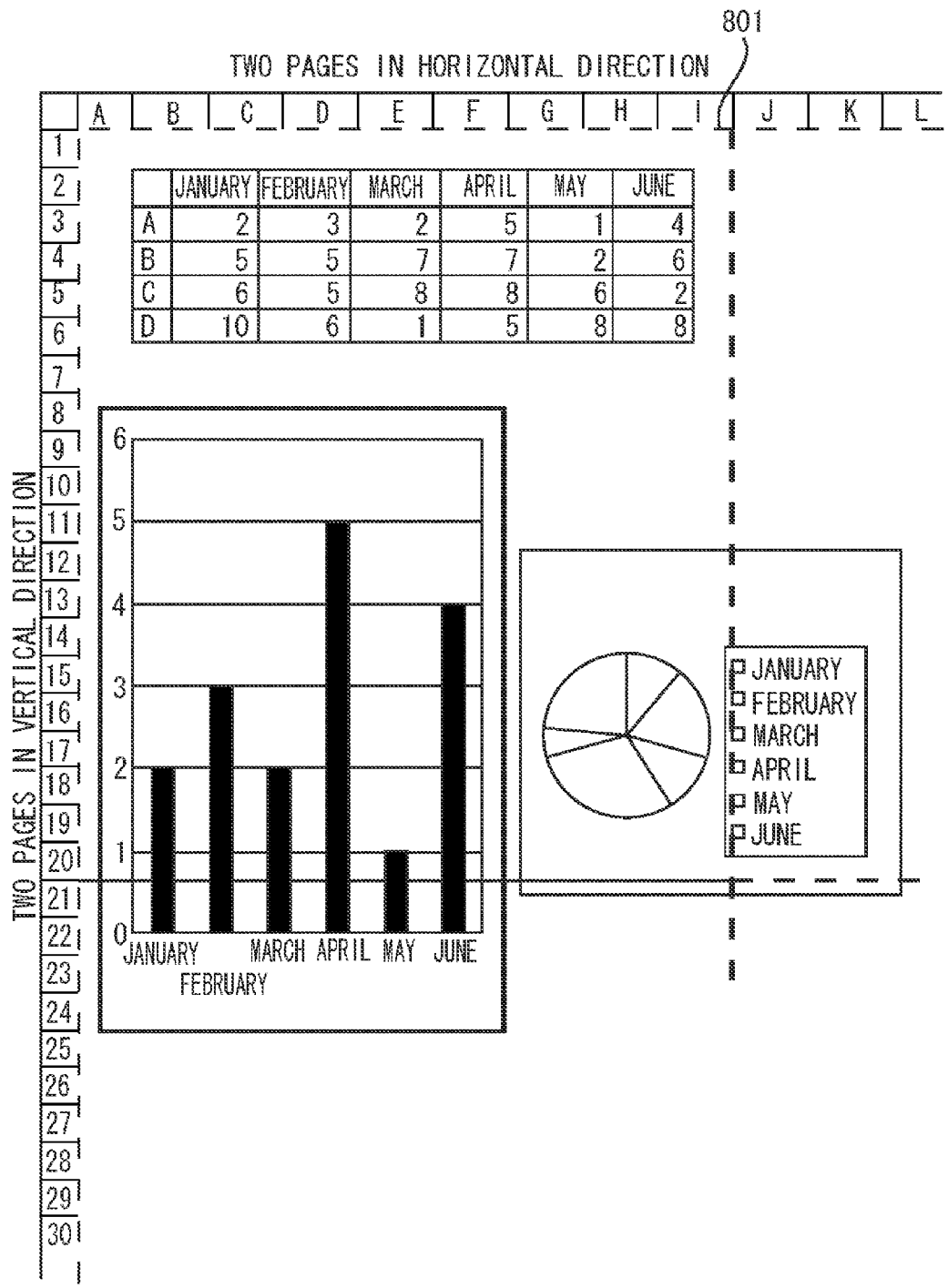
FIG. 9 illustrates a page when a dummy paper size is set in the spreadsheet document illustrated in FIG. 8.

FIG. 9 illustrates a page when a dummy paper size is set in the spreadsheet document illustrated in FIG. 8. As illustrated in FIG. 9, the spreadsheet document is divided into two pages in the horizontal direction and two pages in the vertical direction based on the dummy paper size. In this case, the paper size calculation program does not perform the processing of steps S706 and S708.

Finally, in step S709, the reduction rate of the spreadsheet document for fitting the cell area in which spreadsheet data is present into one page is acquired for the dummy paper size. Then, in step S710, the size obtained by dividing the dummy paper size by the acquired reduction rate, namely, an expanded size, is set as the paper size.

Figure 10:
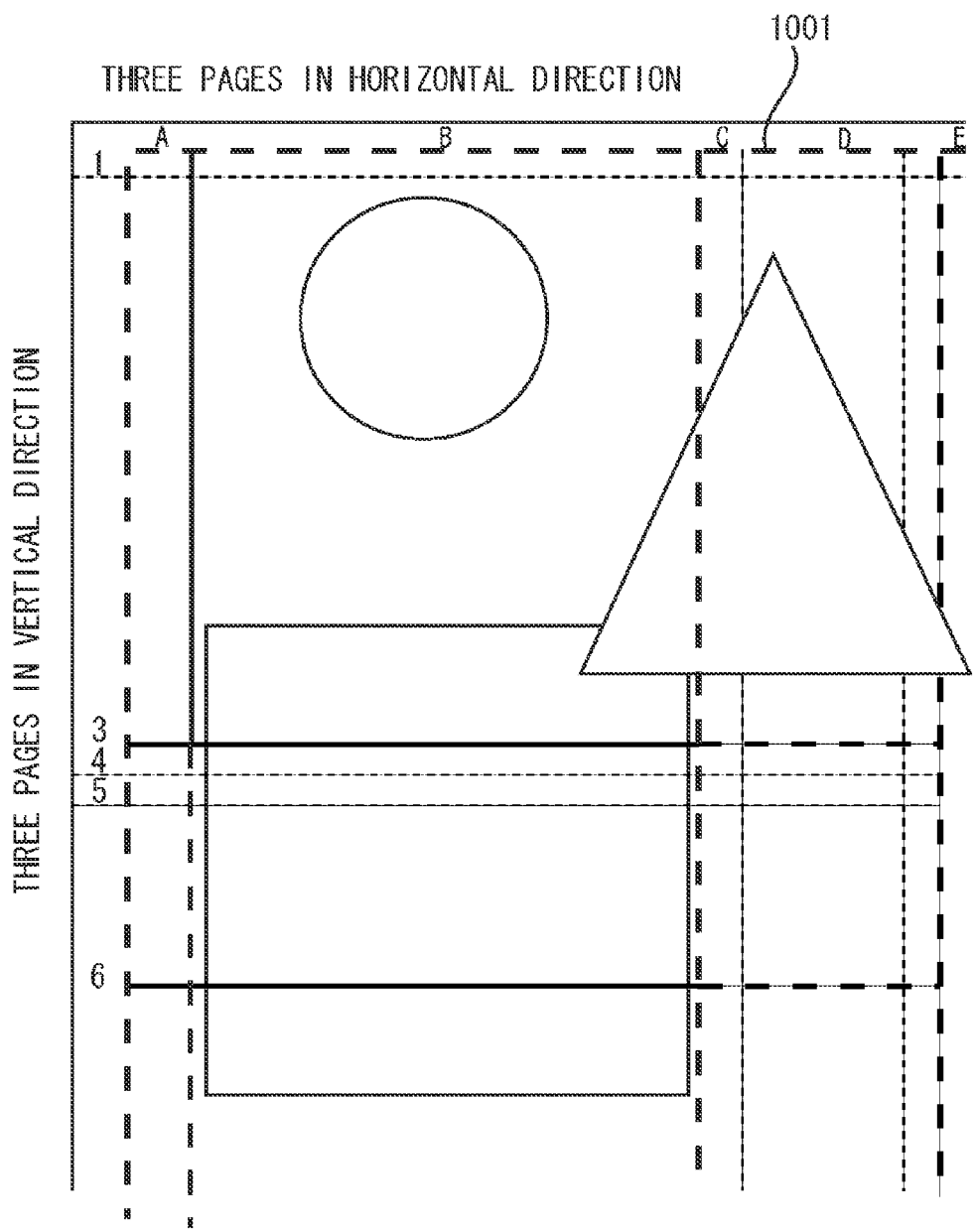
FIG. 10 illustrates a page when a standard paper size is set for an example of a spreadsheet document.

Next, as another example, FIG. 10 illustrates a page when the standard paper size is set for an example of a spreadsheet document. As illustrated in FIG. 10, the spreadsheet document has cells of various different sizes.

The area enclosed by dotted lines 1001 in FIG. 10 indicates cell areas which are allocated to respective pages when the standard paper size is set. For the standard paper size, these areas are set as three pages in the horizontal direction×three pages in the vertical direction.

As illustrated in FIG. 10, when the cell sizes are different, a number of cells which fit into one page is also different. Thus, for such a spreadsheet document, if the dummy paper size (width: three times the standard paper size width, height: three times the standard paper size height) is calculated, the result is often larger than the paper size which is desired to use (paper size which is printed to the very edge of the roll paper width). Therefore, in steps S705 to S707, the dummy paper size is reduced by the paper size calculation program to about a size which does not fit into a 1×1 page.

Next, in step S709, the reduction rate of the spreadsheet document for fitting the whole cell area in which spreadsheet data is present into one page is acquired for the current dummy paper size. Then, in step S710, the size obtained by reducing the dummy paper size by the above-described reduction rate is set as the paper size.

Thus, as described above, by executing the plug-in of the present exemplary embodiment, the paper size for fitting the whole cell area in which spreadsheet data is present just into one page can be determined. Therefore, since the paper size into which the printing area fits is automatically calculated merely by the user sending a print instruction, it is no longer necessary to perform the work which the user was conventionally required to do, which improves operability. For example, a spreadsheet document can be printed on roll paper to the very edges of the page by a simple operation.

While the present exemplary embodiment is described using an example of printing on roll paper, the present invention is not limited to use of the roll paper. The present invention can be applied to cut paper having a fixed aspect ratio.

Further, while the present exemplary embodiment is described using an example of spreadsheet software as a printing target application, the present invention is not limited to this application. The present invention can be applied in applications which do not have a page concept and can arbitrarily select printing area size and aspect ratio.

Aspects of the present invention can also be realized by a computer of a system or apparatus (or devices such as a CPU or micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-233164, filed Sep. 11, 2008, which is hereby incorporated by reference herein in its entirety.

What is claimed is:

1. A method for causing an application capable of allocating a page to a printing area, to generate data, the method comprising:
   causing the application to allocate at least one page of a predetermined size to the printing area;
   acquiring a vertical number of pages, of the predetermined size, allocated by the application with respect to a vertical direction of the printing area and a horizontal number of pages, of the predetermined size, allocated by the application with respect to a horizontal direction of the printing area, based on the allocating of the at least one page by the application;
   multiplying a vertical length of the predetermined size and a horizontal length of the predetermined size by the acquired vertical number of pages and the acquired horizontal number of pages, respectively, to obtain a vertical length and a horizontal length; and
   causing the application to generate data of the printing area in a page of a page size corresponding to the vertical length and the horizontal length obtained by the multiplying, by setting the page size to the application.

2. The method according to claim 1, further comprising:
   notifying a printer driver of a first page size of the page corresponding to the data generated by the application, wherein the printer driver sets changing of the first page size to a second page size corresponding to a size of a sheet used in a printer.

3. The method according to claim 2, wherein the printer driver causes a printing apparatus to print the page, corresponding to the generated data, of the second page size.

4. The method according to claim 2, wherein the second page size is a length of one side of a sheet.

5. The method according to claim 4, wherein the sheet is a continuation sheet used in the printer, and the second page size is a width of the continuous sheet.

6. The method according to claim 1, wherein the application is spreadsheet software and an enterable cell indicated by the spreadsheet software is printed.

7. The method according to claim 6, wherein the printing area corresponds to cells selected based on an instruction from a user.

8. The method according to claim 6, wherein the printing area corresponds to entered cells.

9. The method according to claim 1, further comprising:
   adjusting the page size so that the adjusted page size fits the printing area;
   wherein data corresponding to a page of the page size adjusted in the adjusting is generated by the application.

10. The method according to claim 9, wherein in a case where the page size is changed, each of one or more pages of the changed page size is allocated to the printing area and, based on a number of the one or more pages, the page size is adjusted.

11. The method according to claim 10, wherein the page size includes a whole area of the printing area and, in the adjusting, the page size is reduced.

12. The method according to claim 1, wherein the at least one page allocated by the application includes the printing area and fits to the printing area.

13. A non-transitory computer-readable recording medium which stores a program for executing the method according to claim 1.

14. The computer-readable recording medium according to claim 13, wherein the program is a plug-in software for the application.

15. An apparatus that causes an application capable of allocating a page to a printing area, to generate data, the apparatus comprising:
   an allocating control unit configured to cause the application to allocate at least one page of a predetermined size to the printing area;
   an acquiring unit configured to acquire a vertical number of pages, of the predetermined size, allocated by the application with respect to a vertical direction of the printing area and a horizontal number of pages, of the predetermined size, allocated by the application with respect to a horizontal direction of the printing area, based on the allocating of the at least one page by the allocating control unit;

a multiplying unit configured to multiply a vertical length of the predetermined size and a horizontal length of the predetermined size by the acquired vertical number of pages and the acquired horizontal number of pages, respectively, to obtain a vertical length and a horizontal length; and a generating control unit configured to cause the application to generate data of the printing area in a page of a page size corresponding to the vertical length and the horizontal length obtained by the multiplying by the multiplying unit, by setting the page size to the application.

16. The apparatus according to claim 15, further comprising:

a notifying unit configured to notify a printer driver of a first page size of the page corresponding to the data generated by the application;

wherein the printer driver sets changing of the first page size to a second page size corresponding to a size of a sheet used in a printer.

17. The apparatus according to claim 16, wherein the printer driver causes a printing apparatus to print the page, corresponding to the generated data, of the second page size.

18. The apparatus according to claim 16, wherein the second page size is a length of one side of a sheet.

19. The apparatus according to claim 15, wherein the application is spreadsheet software and an enterable cell indicated by the spreadsheet software is printed.

20. The apparatus according to claim 19, wherein the printing area corresponds to cells selected based on an instruction from a user.

21. The apparatus according to claim 19, wherein the printing area corresponds to entered cells.

22. The apparatus according to claim 15, further comprising:

an adjusting unit configured to adjust the page size so that the adjusted page size fits the printing area;

wherein data corresponding to a page of the adjusted page size adjusted by the adjusting unit is generated by the application.

\* \* \* \* \*